(12) United States Patent
Tamizkar

(10) Patent No.: US 12,010,021 B2
(45) Date of Patent: Jun. 11, 2024

(54) METHOD AND SYSTEM FOR ROUTING DATA FRAMES IN A NETWORK TOPOLOGY

(71) Applicant: Telia Company AB, Solna (SE)

(72) Inventor: Babak Tamizkar, Stockholm (SE)

(73) Assignee: Telia Company AB (SE)

( * ) Notice: Subject to any disclaimer, the term of this patent is extended or adjusted under 35 U.S.C. 154(b) by 0 days.

(21) Appl. No.: 18/138,255

(22) Filed: Apr. 24, 2023

(65) Prior Publication Data

US 2023/0344762 A1 Oct. 26, 2023

(30) Foreign Application Priority Data

Apr. 22, 2022 (SE) .................................. 2250484-9

(51) Int. Cl.
*H04L 45/745* (2022.01)
*H04L 45/00* (2022.01)
*H04L 45/24* (2022.01)

(52) U.S. Cl.
CPC ............ *H04L 45/745* (2013.01); *H04L 45/24* (2013.01); *H04L 45/566* (2013.01); *H04L 45/72* (2013.01)

(58) Field of Classification Search
CPC ..... H04L 45/745; H04L 45/566; H04L 45/24; H04L 45/72
See application file for complete search history.

(56) References Cited

U.S. PATENT DOCUMENTS 8,144,698 B2 * 3/2012 Sargor ................ H04L 61/2528
370/236
2008/0250496 A1 10/2008 Namihira
(Continued)

FOREIGN PATENT DOCUMENTS

CN 107800629 A 3/2018
CN 114389987 A 4/2022

OTHER PUBLICATIONS

Conran, Matt, "IP Forwarding", Aug. 10, 2014, https://network-insight.net/2014/08/10/ip-forwarding/. (Year: 2014).*
(Continued)

*Primary Examiner* — Nam T Tran
(74) *Attorney, Agent, or Firm* — Burr & Forman LLP

(57) ABSTRACT

The embodiments herein relate to a method and a system for routing data frames. The method comprising, a first router (R12 120) receiving from a first node (Node-A 121) a data frame. The first router (R12 120) replacing the source MAC address field in the data frame with a MAC address of an egress interface of the first router (R12 120). The first router (R12 120) determining, a MAC address of an ingress interface of a second router (R0 130), and replacing the destination MAC address field of the data frame with the MAC address of the ingress interface of the second router (R0 130). The first router (R12 120) sending the data frame to the second router (R0 130) which replaces the destination MAC address field with the MAC address of the ingress interface of a third router (R34 140). The second router (R0 130) setting the MAC address of the egress interface of the first router (R12 120) in routing table of the second router (R0 130) that matches with the source IP address field of the received data frame, and the second router (R0 130) sending the data frame to the third router (R34 140) through an egress interface of the second router (R0 130) that matches with the destination IP address field of the received data frame.

22 Claims, 6 Drawing Sheets

5) From Node-D to R34

| Layer 2 address | | Layer 3 address | | Payload |
|---|---|---|---|---|
| Destination MAC address | Source MAC address | Source IP address | Destination IP address | |
| ee:04 | dd:40 | 40.0.0.40 | 10.0.0.10 | |

6) From R34 to R0

| Layer 2 address | | Layer 3 address | | Payload |
|---|---|---|---|---|
| Destination MAC address | Source MAC address | Source IP address | Destination IP address | |
| ee:12 | ee:34 | 40.0.0.40 | 10.0.0.10 | |

7) From R0 to R12

| Layer 2 address | | Layer 3 address | | Payload |
|---|---|---|---|---|
| Destination MAC address | Source MAC address | Source IP address | Destination IP address | |
| ee:12 | ee:34 | 40.0.0.40 | 10.0.0.10 | |

8) From R12 to Node-A

| Layer 2 address | | Layer 3 address | | Payload |
|---|---|---|---|---|
| Destination MAC address | Source MAC address | Source IP address | Destination IP address | |
| aa:10 | ee:01 | 40.0.0.40 | 10.0.0.10 | |

(56) References Cited

U.S. PATENT DOCUMENTS

2011/0264806 A1   10/2011  Tuck et al.
2016/0087887 A1*  3/2016  Fung .................. H04L 49/3009
                                                        370/401
2020/0236044 A1*  7/2020  Tamizkar ................ H04L 45/74

OTHER PUBLICATIONS

Swedish Search Report, Swedish Patent Application No. 2250484-9, dated Dec. 1, 2022, SwedishPatent and Trademark Office.

* cited by examiner

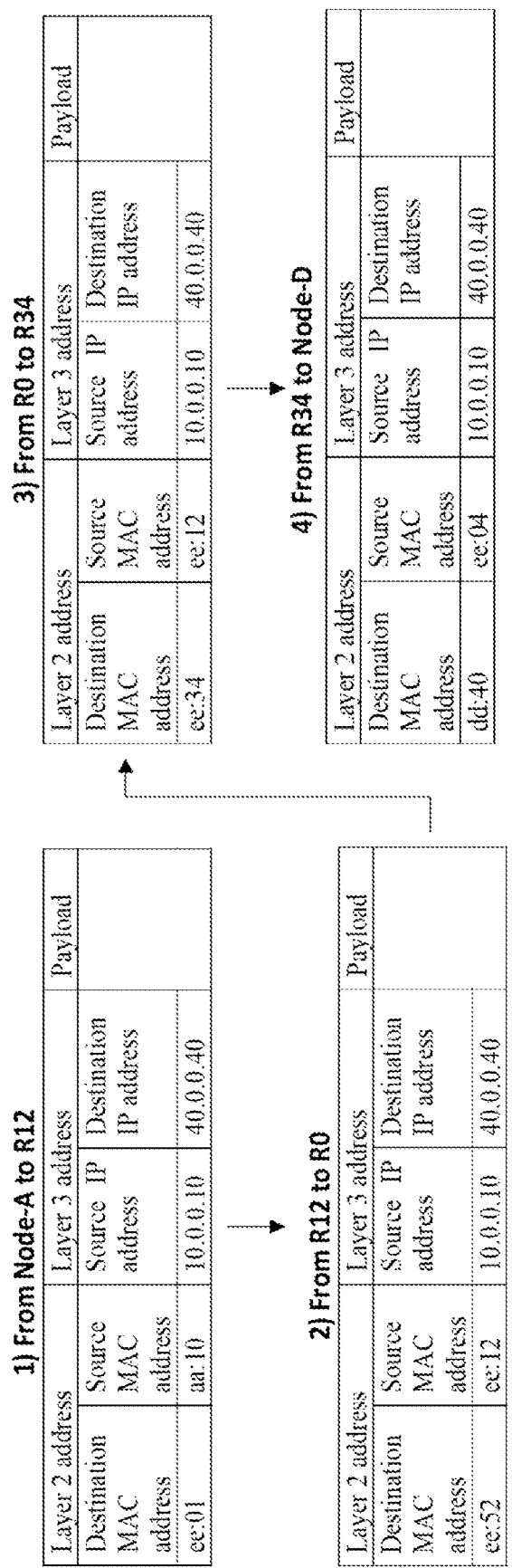
Figure 2A – Structure of data frame: Node-A →R12→ R0→ R34→ Node-D

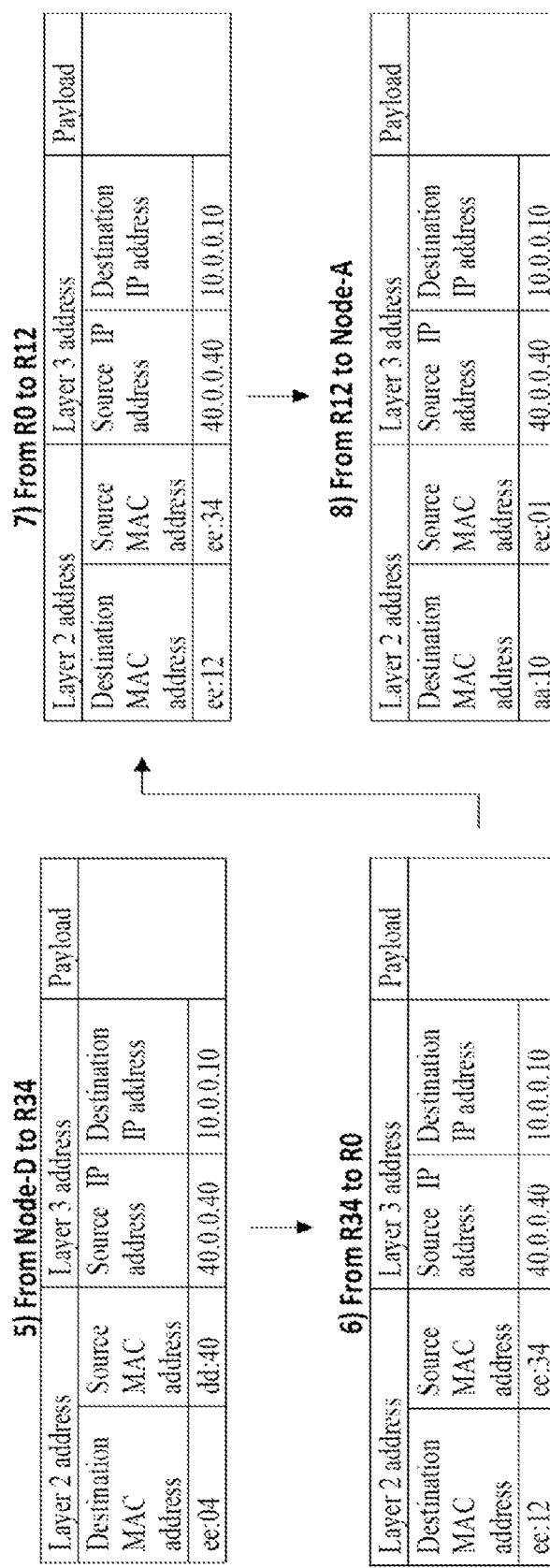
Figure 2B – Structure of data frame: Node-D→R34→R0→ R12→Node-A

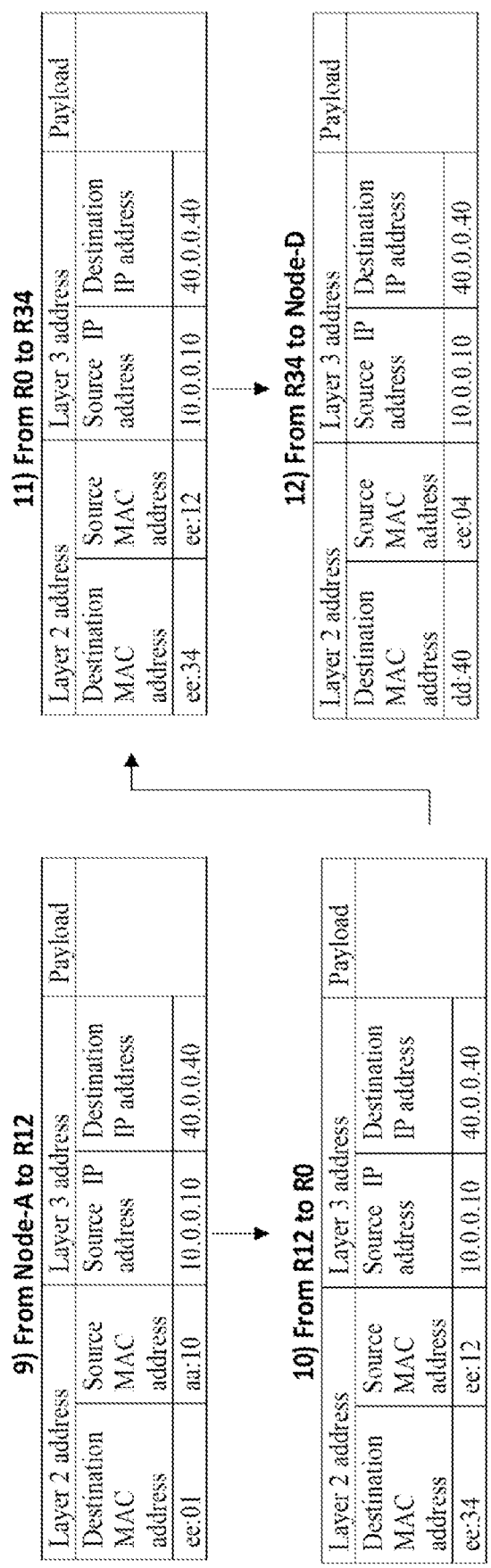
Figure 2C – Structure of data frame: Node-A →R12→ R0→ R34→ Node-D

METHOD AND SYSTEM FOR ROUTING DATA FRAMES IN A NETWORK TOPOLOGY

TECHNICAL FIELD

The present disclosure relates generally to the field of data communications, and more particularly to a method and a system for routing data frames or traffic in a network topology comprising a plurality of routers and a plurality of nodes.

BACKGROUND

Networks in the Internet are connected to each other via routers. Routers carry traffic from one network/subnet to another. Routers use routing protocols to ensure data makes it from a source node to the intended destination node. Each router in the network maintains a routing table which includes information regarding the available routes to various network destinations. Routers execute routing protocols to dynamically update the routing tables of the routers, and to discover information about the network topology around the router. If two nodes or machines are located in different subnets or in different broadcast domains, the traffic from a source node passes through a router to reach a destination node. The reason being that when the nodes are in different broadcast domains, their Internet Protocol (IP) addresses are also in different subnets. When the router receives a packet or data frame from a source node, the router looks at the source and destination IP addresses indicated in the data frame, and uses its routing table to find the right direction (i.e., the best path) to forward the frame towards the destination node. The Router looks up the destination MAC (Media Access Control) address in its routing table to determine where the data frame needs to be forwarded. All the routers do the same until the frame reaches to the destination node. Routing protocols are mechanisms by which routing information is exchanged between routers so that routing decisions can be made. There are different routing protocols, but they all are designed for one main purpose and it is to find the best path.

In summary a same type of routing protocol is configured on connected routers. Each instance of the routing protocol on each router starts to communicate with the other to get to know how many routers are available and how they are connected to each other. Routers advertise their directly connected subnets as well as received subnets from other routers to their neighbors. Then, the routers run an algorithm to make the best path between all routers (subnets). At the end, each router know which subnets exist in the network and what is the best path (next hop) to reach to other subnets. All this information is then available in a table known as a routing table.

Referring to FIG. 1, there is illustrated an example of a network topology including four subnets (subnet-10, subnet-20, subnet-30 and subnet-40) or four broadcast domains (BD-10, BD-20, BD-30 and BD-40). As shown, subnet-10 and subnet-20 are connected to router R12, 120; subnet-30 and subnet-40 are connected to router R34, 140, while router R0, 130 is not connected to any subnet. It should be noted that the network topology of FIG. 1 is only an example. For instance, router R0 may also be connected to other subnets, and the network topology may consist of any number of routers, nodes, switches, subnets, domains etc.

The IP address range of each subnet is also depicted.
Subnet-10 has IP address range: 10.0.0.0/24
Subnet-20 has IP address range: 20.0.0.0/24
Subnet-30 has IP address range: 30.0.0.0/24
Subnet-40 has IP address range: 40.0.0.0/24
Node-A, 121 in subnet-10 is shown having IP address: 10.0.0.10/24 and MAC address: aa:aa:aa:aa:aa:10. For simplicity, all the MAC addresses are shown in short format in this disclosure. For instance, MAC address of Node-A is aa:aa:aa:aa:aa:10, but is shown as aa:10.
Node-B, 151 in subnet-20 is shown having IP address: 20.0.0.20/24 and MAC address: bb:20.
Node-C, 131 in subnet-30 is shown having IP address: 30.0.0.30/24 and MAC address: cc:30.
Node-D, 141 in subnet-40 is shown having IP address: 40.0.0.40/24 and MAC address: dd:40.

The different interfaces Inte1-Int6 are also shown in FIG. 1. The IP addresses associated with each interface and the MAC addresses are also depicted.

Below is shown the routing table of each router. Each routing table includes the destination subnet IP range; the IP address of the next hop and the egress interface:

R12 Routing Table

| Route Line | Destination Subnet | Next hop | Egress interface |
| --- | --- | --- | --- |
| 1 | 30.0.0.0/24 | 50.0.0.2 | Int5 |
| 2 | 40.0.0.0/24 | 50.0.0.2 | Int5 |
| 3 | 50.0.0.0/30 | "Directly connected" | Int5 |
| 4 | 10.0.0.0/24 | "Directly connected" | Int1 |
| 5 | 20.0.0.0/24 | "Directly connected" | Int2 |

R0 Routing Table

| Route Line | Destination Subnet | Next hop | Egress interface |
| --- | --- | --- | --- |
| 1 | 30.0.0.0/24 | 60.0.0.1 | Int6 |
| 2 | 40.0.0.0/24 | 60.0.0.1 | Int6 |
| 3 | 10.0.0.0/24 | 50.0.0.1 | Int5 |
| 4 | 20.0.0.0/24 | 50.0.0.1 | Int5 |
| 5 | 50.0.0.0/30 | "Directly connected" | Int5 |
| 6 | 60.0.0.0/30 | "Directly connected" | Int6 |

R34 Routing Table

| Route Line | Destination Subnet | Next hop | Egress interface |
| --- | --- | --- | --- |
| 1 | 10.0.0.0/24 | 60.0.0.2 | Int6 |
| 2 | 20.0.0.0/24 | 60.0.0.2 | Int6 |
| 3 | 60.0.0.0/30 | "Directly connected" | Int6 |
| 4 | 30.0.0.0/24 | "Directly connected" | Int3 |
| 5 | 40.0.0.0/24 | "Directly connected" | Int4 |

For example, Line 1 of the routing table of R12 indicates what to reach subnet-30 (IP range 30.0.0.0/24), the next hop router has IP address 50.0.0.2 (which is of router R0) and the egress interface Inte5 of router R12 is used to send/forward the data frame of the packet.

Hence, when a data frame reaches a router (e.g., R12), R12 looks at the destination IP address field inside the layer 3 part of the data frame, then R12 looks at its routing table to find the route line match with a subnet (e.g., subnet-30). If there is such a subnet in the table, R12 looks to see where it should forward the data frame. R12 needs two entries for forwarding:
1) the interface that R12 should sent out the data frame though (egress interface) (e.g., Int5)
2) the MAC address of the next hop IP address (next router in the path (here R0))

The router knows the egress interface to forward the data frame to the right direction. The router also knows its ingress interface(s). As an example, router R12 knows that Int5 is its egress interface and Int1 and Int2 are its ingress interfaces.

When the router R12 makes the decision to where the frame should be forwards, the router needs the MAC address of the next hop router to use it as the destination MAC address for layer two.

Layer two addresses (source MAC address and destination MAC address) will both be changed whenever a data frame pass through a layer three device like the router. The router sets the MAC address of its egress interface as the source MAC address in the data frame and sets the MAC address of the ingress interface of the next hop router as the destination MAC address into the layer two part of the data frame. The router can see the next IP address of the data frame in its routing table. Router then sends out an ARP (Address Resolution Protocol) request to that IP address to get the MAC address of the ingress interface of the next hop router.

So, the process is as follows (with reference to FIG. 1 and to routing table of router R12). When Node-A generates a data frame for sending to a destination node Node-D, Node-A sets its own IP address as the source IP address in the data frame and it set the IP address of Node-D as the destination IP address in the data frame. Node-A also sets its own MAC address (aa:10) as the source MAC address in the data frame and sets the MAC address (ee:01) of its default gateway or router R12) (10.0.0.1) as the destinations MAC address in the data frame. Node-A then sends the frame to R12.

We assume that a routing protocol is already run between R12, R0 and R34 and each router has an updated routing table. It means that each router knowns about all BDs or subnets connected to any other outer and knows what the best path is to reach to them.

The data frame arrives to router R12. R12 looks at the layer three part of the data frame to see what the destination IP address is. The routing table of R12 shows that the next hop is 50.0.0.2 (the IP address of R0-Int5) and its egress interface is Int5. R12 sets the MAC address of its own interface Int5 as source MAC address and the MAC address of R0-Int5 as the destination MAC address field of the data frame and then R12 sends out the data frame through its egress interface Int5. R0 received the data frame and also does the same as R12 i.e., R0 looks up the egress port for destination IP address and replaces the source and destination MAC addresses of the data frame with the new ones. R0 then forwards the frame to R34.

When R34 receives the data frame it also looks at the destination IP address of the data frame and based on its routing table it sees that the destination IP address is of a node (Node-D) connected to R34:s interface Int4. R34 gets the MAC address of the Node-D with that IP address 40.0.0.40 and sends out the data frame through its egress Int-4. Node-D then receives the data frame, and the one communication between Node-A and Node-D is completed.

Hence, each router has to open every single arrived data frame up to layer three part (source and destination IP address) to be able make the forwarding decision. Also, each router has to replace both source and destination MAC address of every single arrived frame before forwarding it.

The above procedure is time consuming and requires a lot of resources of each router, for each received data frame, in addition to a decrease in data frame forwarding speed in the network topology.

There is therefore a need for a new method and system that reduces resources of the routers, and also increase the traffic forwarding speed in the network topology.

SUMMARY

It is an object of embodiments herein to provide a solution for routing traffic in a network topology that obviates the problems issues known from the prior art.

According to an aspect of embodiments herein, there is provided a method for routing data frames in a network topology comprising a plurality of routers and a plurality of nodes; the method comprising: a first router receiving from a first node a data frame including: an IP address of the first node in a source IP address field of the data frame, an IP address of a second node in a destination IP address field of the data frame, a MAC address of the first node in a source MAC address field of the data frame, and in a destination MAC address field of the data frame a MAC address of an ingress interface of the first router obtained by the first node from the first router. If the first router is a source router, the first router replacing the source MAC address field in the data frame with a MAC address of an egress interface of the first router, wherein the egress interface of the first router is indicated in an entry line of a routing table of the first router that matches with the destination IP address field in the received data frame. The first router determining, based on the IP address of the second node, a MAC address of an ingress interface of a second router, and replacing the destination MAC address field of the data frame with the MAC address of the ingress interface of the second router. The first router sending the data frame to the second router through the egress interface of the first router. If the second router is a transit router, the transit router determining, based on the IP address of the second node indicated in the destination IP address field in the received data frame, a MAC address of an ingress interface of a third router, and the second router replacing the destination MAC address field in the received data frame with the MAC address of the ingress interface of the third router.

The method further comprises, the second router as the transit router setting/indicating the MAC address of the egress interface of the first router indicated in the source MAC address field of the data frame, in an entry line of a routing table of the transit router that matches with the source IP address field of the received data frame; and the second router sending the data frame to the third router through an egress interface of the second router that matches with the destination IP address field of the received data frame.

According to an embodiment, if the third router is the destination router, the destination router replacing the destination MAC address of the received data frame with the MAC address of the second node; and the source MAC address of the data frame with the MAC address of an egress interface of the third router, wherein the egress interface of the third router is indicated in an entry line of the routing table of the third router that matches with the destination IP address field in the received data frame, and the third router forwarding the data frame to the second node based on the destination MAC address indicated in the data frame. The third router setting/indicating the MAC address of the egress interface of the first router indicated in the source MAC address field of the data frame, in an entry line of a routing table of the third router that matches with the source IP address field of the received data frame.

According to another aspects of embodiments herein, there is provided a system according to any one of claims 14-26, for routing data frames in a network topology comprising a plurality of routers and a plurality of nodes.

An advantage with embodiments herein is to improve the performance of each router and also to increase the traffic forwarding speed of each router, in addition to reducing resources of the routers in the network topology.

Additional advantages achieved by the embodiments of the present invention will become apparent from the following detailed description when considered in conjunction with the accompanying drawings.

BRIEF DESCRIPTION OF THE DRAWINGS

Example of embodiments herein are described in more detail with reference to attached drawings in which:

FIG. 2A illustrates the structure of the data frame from Node-A through the routers to Node-D.

FIG. 2B illustrates the structure of the data frame from Node-D through the routers to Node-A.

FIG. 2C illustrates the structure of the data frame from Node-A through the routers to Node-D.

DETAILED DESCRIPTION

Figure 1:
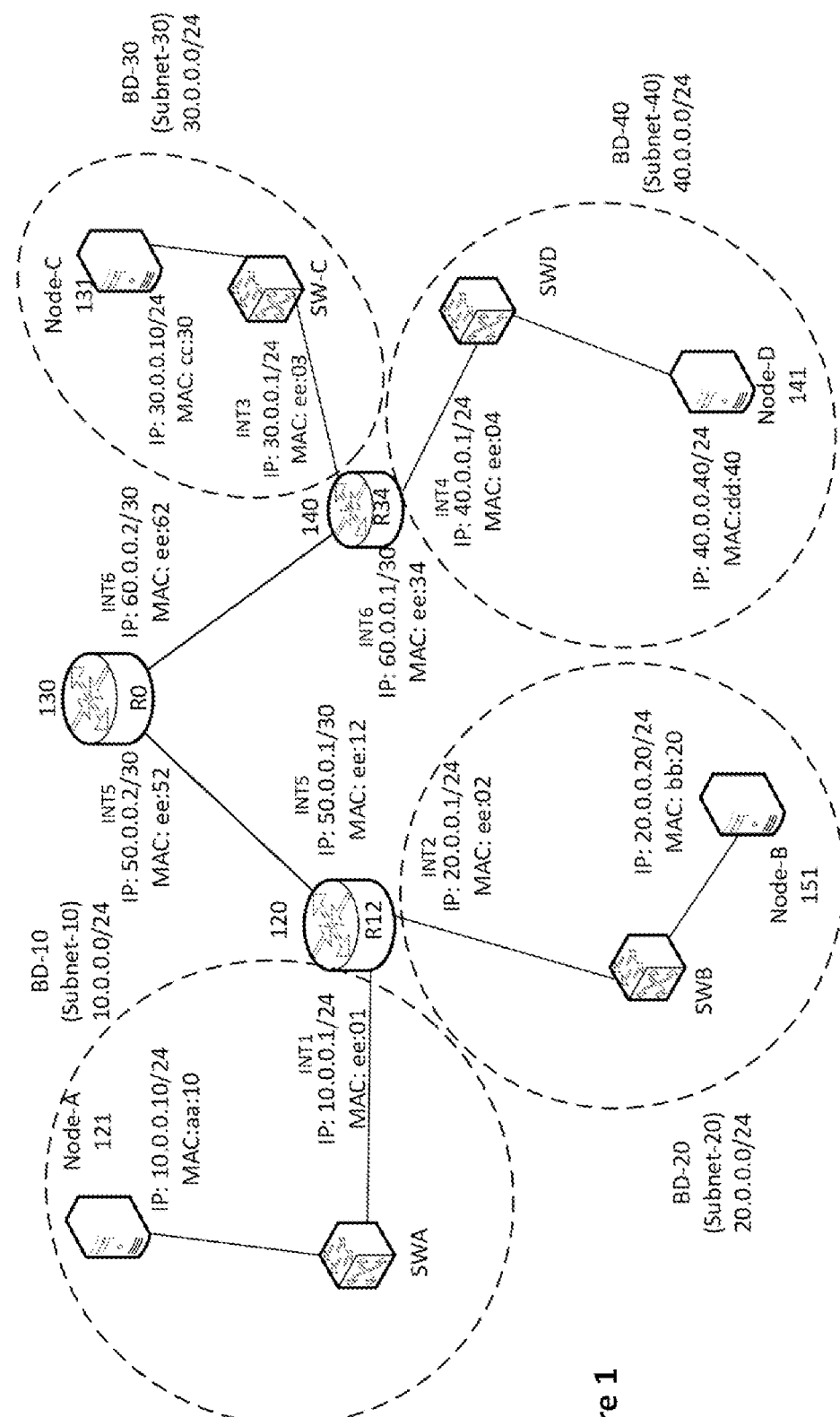
FIG. 1 is an example of a network scenario or network topology or system involving routers, host nodes and subnets, wherein embodiments herein may be applied.

In the following, a detailed description of the exemplary embodiments is presented in conjunction with the drawings to enable easier understanding of the solutions(s) described herein.

It should be noted that the embodiments herein may be employed in any network topology or system involving any number router devices, subnets, nodes, switches, etc. Also, any suitable routing protocol may be used.

Reference is again made to FIG. 1 which is a simplified drawing illustrating a communication network topology including a plurality of subnets, routers, nodes etc.

Before going into the details of the embodiments of the present disclosure for routing data frames in the network topology or system, the following definitions are provided for the role of a router.

There are four roles for a router.

Closed Router:

When such a router receives a data frame, it looks at the source IP address field of the data frame. If the source IP address is in the same subnet as the IP address of the ingress interface of the router, the router looks at the destination IP address field of the data frame. If the destination IP address is in the same subnet of one of the directly connected subnet of the router, then this router is a closed router. In this case the closed router sends out the data frame to the destination node though the interface connected to the destination subnet. The router follows the standard routing procedure by setting the source MAC address field of the frame same as the MAC address of the egress interface and also by setting the destination MAC address field of the frame with the MAC address of the destination node. The MAC address of the destination node may be in the ARP table of the router, otherwise the router may need to send an ARP request to the destination subnet to find the destination node's MAC address.

Source Router

When such a router receives a data frame, it looks at the source IP address field of the data frame. If the source IP address is in the same subnet as the IP address of the ingress interface of the router, the router looks at the destination IP address field of the data frame. If the destination IP address field of the data frame matches with any of the router's route lines, but not a "directly connected" lines, then this router is a source router. In other words, if the source IP address in the received data frame is in a same subnet as an IP address of the ingress interface of the first router and the destination IP address field of the received data frame is not in a same subnet as an IP address of anyone of the interfaces of the first router, then the router is a source router. Later on, will be explained how the router handles the data frame for forwarding to the destination node.

Transit Router

When such a router receives a data frame, if the source IP address entry is not in the same subnet as the IP address of the ingress port or ingress interface of the router, the router looks at the destination IP address field of the frame. If one of the route lines (except the "directly connected" ones) matches with the destination IP address of the frame, then this router is a transit router. In other words, if the source IP address and the destination IP address indicated in the data frame are not in a same subnet as an IP address of anyone of the interfaces of the second router, then this router is a transit router. Later on, will be described how the router handles the data frame for forwarding to the destination node.

Destination Router

When the router receives a data fame, if the source IP address entry field of the arrived frame is not in same subnet with the IP address of the ingress interface of the router, in this case, the router looks at the destination IP address field of the data frame. If one of the route lines of the router ("Directly Connected" one) matches with the destination IP address of the frame, then this router is a destination router. In other words, if the destination IP address indicated in the data frame received by the router is in a same subnet as an IP address of one of the interfaces of the third router, then the router is destination router. Later on, will be explained how the router handles the data frame for forwarding to the destination node.

In the following, a procedure or method for routing data frames in a network topology (such as in FIG. 1), according to embodiments herein is described. With reference to FIG. 1, assuming that Node A, 121 wants to send a data frame to node-D, 141.

We call this SCENARIO 1

Below is the routina table of router R12. 120.

| Route Line | Destination Subnet | Next hop | Egress interface | Ref. MAC |
|---|---|---|---|---|
| 1 | 30.0.0.0/24 | 50.0.0.2 | Int5 | |
| 2 | 40.0.0.0/24 | 50.0.0.2 | Int5 | |
| 3 | 50.0.0.0/30 | "Directly connected" | Int5 | |

-continued

| Route Line | Destination Subnet | Next hop | Egress interface | Ref. MAC |
|---|---|---|---|---|
| 4 | 10.0.0.0/24 | "Directly connected" | Int1 | |
| 5 | 20.0.0.0/24 | "Directly connected" | Int2 | |

As shown, the routing table of R12 includes a new column, refers to as Reference MAC (Ref. MAC). R12 advertises subnet-10 and subnet-20 through interface Int5 with MAC address ee:12. It should be mentioned that R12 may add, as the Ref. MAC for those two route lines that match with the subnets. However, adding the Ref. MAC entry (ee:12) for the "directly connected" subnets 10 and 20 in the routing table of R12 120 is not necessary.

As shown in FIG. 1, when Node-A 121 (also refers to as first node) wants to communicate with Node-D 141 (also refers to as second node), Node-A 121 with IP address 10.0.0.10/24 generates a data frame to send to R12 120 (also referred to as first router). The structure of the data frame before sending to R12 120 is shown below:

| Layer 2 address | | Layer 3 address | | |
|---|---|---|---|---|
| Destination MAC address | Source MAC address | Source IP address | Destination IP address | |
| ??? | aa:10 | 10.0.0.10 | 40.0.0.40 | Payload |

Since the source IP address field indicates the IP address of Node-A 121 (10.0.0.10), which is in the same subnet as an IP address of the ingress interface Int1 of R12 120, wherein the IP subrange of the subnet is 10.0.0.0/24; and the destination IP address field indicated the IP address of Node-D 141 (40.0.0.40) which is not in the same subnet as an IP address of anyone of the interfaces of R12 120, router R12 120 is a source router to Node-A 121.

If Node-A 121 does not have the MAC address of the ingress interface of R12 120, Node-A 121 needs to send an ARP request to R12 120 to obtain the MAC address of the ingress interface of R12 120. Hence, Node-A 121 obtains MAC address ee:01 of the ingress interface Int1 of R12 120. The obtained MAC address is set/indicated by Node-A 121 in the destination MAC address field of the data frame.

The data frame from Node-A 121 to R12 120 is shown below and includes the following information:

| Layer 2 address | | Layer 3 address | | |
|---|---|---|---|---|
| Destination MAC address | Source MAC address | Source IP address | Destination IP address | |
| ee:01 | aa:10 | 10.0.0.10 | 40.0.0.40 | Payload |

Destination MAC address field: ee:01—which is the MAC address of the ingress interface Int1 of R12 120.
Source MAC address field: aa:10—which is the MAC address of Node-A 121.
Source IP address field: 10.0.0.10—which is the IP address of Node-A 121
Destination IP address field: 40.0.0.40—which is the IP address of Node-D 141.
Node-A 121 then sends the data frame to router R12 120 (i.e., to the source router R12). R12 120 checks the destination MAC address field of the data frame and sees the MAC address ee:01 of its ingress interfaces Int1. Router R12 120 looks at the source IP address field of the data frame. As the source IP address is 10.0.0.10 which is in the same subnet as the IP address of the ingress interface 10.0.0.1/24, then the router looks at the destination IP address field of the data frame. Since the destination IP address field includes destination IP address 40.0.0.40 which matches with one of the entry lines (line 2) of the routing table of R12 120 and it is not a "directly connected" one, then R12 120 is the source router. In this case R12 120 needs to know the egress interface of R12 120 indicated in entry line 2 of the routing table of R12 that matches with the destination IP address field of the received data frame. This interface is indicated as Int5 in entry line 2 of the routing table of R12 120.

Before sending the data frame through Int5, R12 120 needs to perform two modifications to the Layer 2 of the received the data frame:

R12 120 replaces the source MAC address field in the data frame with a MAC address of the egress interface of R12 120, i.e., replaces aa:10 with ee:12; and R12 120 looks at the Ref. MAC entry of the route line (#2) that matches with the IP address Node-D 141 (40.0.0.40). Since the Ref. MAC entry is empty, R12 120 needs to determine, based on the IP address 40.0.0.40 of Node-D 141, the MAC address of an ingress interface of a second router (R0 130) (i.e. the MAC address of the interface of the second router R0 130 that the interface's IP address is, in the next hop entry of the route line (#2) that matches with the IP address of Node-D 141 (40.0.0.40)), and replaces the destination MAC address field of the data frame with the MAC address of the ingress interface of router R0 130. Router R12 120 either retrieves the MAC address of the ingress interface of R0 130 from an ARP table of R12 120, or if not present in the ARP table of R12 120, R12 120 sends an ARP request to the second router R0 to obtain the MAC address of the ingress interface of R0 130. R12 120 then replaces the destination MAC address field of the data frame with the MAC address of the ingress interface of R0 130, which is ee:52. Subsequently R12 120 sends the data frame to R0 130 through egress interface Int5 of R12 120.

The structure of data frame from R12 120 to R0 130 is shown below:

| Layer 2 address | | Layer 3 address | | |
|---|---|---|---|---|
| Destination MAC address | Source MAC address | Source IP address | Destination IP address | |
| ee:52 | ee:12 | 10.0.0.10 | 40.0.0.40 | Payload |

R0 130 then receives this data frame. Because the source IP address and the destination IP address indicated in the data frame are not in a same subnet as an IP address of anyone of the interfaces of router R0 130, then router R0 130 is a transit router.

The routing table of R0 130 is shown below:

| Route Line | Destination Subnet | Next hop | Egress interface | Ref. MAC |
|---|---|---|---|---|
| 1 | 30.0.0.0/24 | 60.0.0.1 | Int6 | |
| 2 | 40.0.0.0/24 | 60.0.0.1 | Int6 | |
| 3 | 10.0.0.0/24 | 50.0.0.1 | Int5 | |
| 4 | 20.0.0.0/24 | 50.0.0.1 | Int5 | |

-continued

| Route Line | Destination Subnet | Next hop | Egress interface | Ref. MAC |
|---|---|---|---|---|
| 5 | 50.0.0.0/30 | "Directly connected" | Int5 | |
| 6 | 60.0.0.0/30 | "Directly connected" | Int6 | |

R0 130 looks at the destination IP address 40.0.0.40 of Node-D 141 indicated in the data frame, and determines based on this destination IP address a MAC address of an ingress interface of a third router (R34 140). Further, because one of the entry lines (not a "directly connected" one) of the routing table of R0 130 (line 2) matches with the destination MAC address field of the data frame, then this router is a transit router. As indicated in line 2 of the routing table of R0 130, the egress interface for sending the data frame to R34 140 is Int6, i.e., to the next hop address 60.0.0.1 indicated in line 2 of the routing table.

R0 130 determines, based on the IP address of Node-D 141, a MAC address of the ingress interface of router R34 140 by either retrieving the MAC address of the ingress interface of R34 140 from an ARP routing table of R0 130, or if not present in the ARP table, by sending an ARP request to R34 140 to obtain the MAC address of the ingress interface of R34 140. R0 130 then replaces the destination MAC address field of the data frame with the MAC address of the ingress interface of R34 140, which is ee:34.

In addition, R0 130 looks at the Ref. MAC address entry mapped to the route line (#3) which matches with the source IP address field (10.0.0.10) of the frame. Because there is no Ref. MAC entry there, router R0 130 sets/indicates the MAC address of the egress interface of (source) router R12 120 indicated in the source MAC address field of the data frame (ee:12), in the entry line (line #3) of the routing table of R0 130 that matches with the source IP address field (10.0.0.10) of the data frame.

The routing table of R0 130 is now as shown below:

| Route Line | Destination Subnet | Next hop | Egress interface | Ref. MAC |
|---|---|---|---|---|
| 1 | 30.0.0.0/24 | 60.0.0.1 | Int6 | |
| 2 | 40.0.0.0/24 | 60.0.0.1 | Int6 | |
| 3 | 10.0.0.0/24 | 50.0.0.1 | Int5 | ee:12 |
| 4 | 20.0.0.0/24 | 50.0.0.1 | Int5 | |
| 5 | 50.0.0.0/30 | "Directly connected" | Int5 | |
| 6 | 60.0.0.0/30 | "Directly connected" | Int6 | |

The data frame from R0 130 to R34 140 to send though interface Int6 of R0 130 is shown below:

| Layer 2 address | | Layer 3 address | | |
|---|---|---|---|---|
| Destination MAC address | Source MAC address | Source IP address | Destination IP address | |
| ee:34 | ee:12 | 10.0.0.10 | 40.0.0.40 | Payload |

As shown, only the destination MAC address field of the data frame is updated with the MAC address of the ingress interface of R34 140. There is no change to the source MAC address field (ee:12) of the data frame. If it was the standard procedure according to the prior art, also the source MAC address field would be updated, whereas in the procedure of the present embodiments, there is no change to the source MAC address field by the transit router R0 130.

R34 140 receives the data frame from R0 130 though its ingress interface Int6. The routing table of R34 140 is shown below:

| Route Line # | Destination Subnet | Next hop | Egress interface | Ref. MAC |
|---|---|---|---|---|
| 1 | 10.0.0.0/24 | 60.0.0.2 | Int6 | |
| 2 | 20.0.0.0/24 | 60.0.0.2 | Int6 | |
| 3 | 60.0.0.0/30 | "Directly connected" | Int6 | |
| 4 | 30.0.0.0/24 | "Directly connected" | Int3 | |
| 5 | 40.0.0.0/24 | "Directly connected" | Int4 | |

R34 140 looks at the destination MAC address field of the data frame and it sees MAC address ee:34 of its ingress interface Int6. As the source IP address field of the data frame (10.0.0.10) is not in the same subnet as the IP address of the ingress interface (60.0.0.1/30), router R34 140 looks at the destination IP address field of the data frame (40.0.0.40). Because the route line (#5) ("directly connected") of the routing table of R34 140 matches with the destination IP address field of the data frame then this router R34 140 is the destination router. In other words, the destination IP address field of the data frame 40.0.0.40 is in the same subnet of an IP address of the interface (40.0.0.1/24) within the subnet IP range 40.0.0.0/24 of router R34 140. Route line (#5) of the routing table of R34 140 also indicates the egress interface Int4 that R34 140 should use to send the data frame to its destination node Node-D 141. But before, forwarding the data frame to Node-D 141, R34 140 replaces the destination MAC address field of the data frame with the MAC address of Node-D 141 (dd:40) and the source MAC address field of the data frame with the MAC address of the egress interface of R34 140 (ee:04). The egress interface of R34 140 is indicated in entry line #5 of the routing table of R34 140, that matches with the destination IP address field of the data frame 40.0.0.40. This egress interface is Int4 as mentioned above.

The data frame that R34 140 sends to Node-D 141 is shown below:

| Layer 2 address | | Layer 3 address | | |
|---|---|---|---|---|
| Destination MAC address | Source MAC address | Source IP address | Destination IP address | |
| dd:40 | ee:04 | 10.0.0.10 | 40.0.0.40 | Payload |

R34 140 sends the data frame to Node-D 141 based on the destination MAC address (dd:40 of Node-D 141) indicated in the data frame. Node-D 141 accepts the data frame since it sees its MAC address (dd:40) in the data frame.

R34 140 also looks at the Ref. MAC address entry mapped to the route line (#1) which matches with the source IP address field (10.0.0.10) of the data frame. Because there is no Ref. MAC entry there, router R34 140 sets/indicates the MAC address of the egress interface of (source) router R12 120 indicated in the source MAC address field of the data frame (ee:12), in the entry line (line #1) of the routing table of R34 140 that matches with the source IP address field (10.0.0.10) of the data frame.

The updated routing table of R34 140 is shown below:

| Route Line # | Destination Subnet | Next hop | Egress interface | Ref. MAC |
|---|---|---|---|---|
| 1 | 10.0.0.0/24 | 60.0.0.2 | Int6 | ee:12 |
| 2 | 20.0.0.0/24 | 60.0.0.2 | Int6 | |
| 3 | 60.0.0.0/30 | "Directly connected" | Int6 | |
| 4 | 30.0.0.0/24 | "Directly connected" | Int3 | |
| 5 | 40.0.0.0/24 | "Directly connected" | Int4 | |

Hence, the transit router R0 130 and the destination router R34 140 update Ref. MAC entry in their routing table by setting the MAC address of the egress interface of the source router R12 120 (ee:12) in the entry line that matches with the source IP address field of the data frame (10.0.0.10). For transit router R0 130, it is the Ref. MAC entry in entry line (#3) of the routing table, and for the destination router R34 140, it is the Ref. MAC entry in the entry line (#1) of the routing table.

FIG. 2A, illustrates the structure of the data frame from Node-A through the routers R12, R0 R 34, destined to Node-D, in accordance with the procedure presented above. As shown, the transit router R0 130 does not change the source MAC address field of the data frame.

The second node, Node-D 141 with IP address 40.0.0.40, may need to respond to the first node, Node-A 121 having IP address 10.0.0.10.

The following procedure, according to some embodiments herein, describes the scenario when Node-D 141 responds to Node-A 121.
We call this SCENARIO 2

The role of the nodes and the routers differs from the previous scenario except for the second router R0 130 which still remains a transit router in the path from source node Node-D 141 to destination node Node-A 120. Router R34 140 now acts as a source router for Node-D 141. Router R0 130 as a transit router, and router R12 120 acts as a destination router. Node-A 121 acts as a destination node.

Node-D 141 generates a data frame destined to Node-A 121, and sends it to its default gateway or its source router R34 140. The data frame from Node-D 141 to R34 140 is shown below:

| Layer 2 address | | Layer 3 address | | |
|---|---|---|---|---|
| Destination MAC address | Source MAC address | Source IP address | Destination IP address | |
| ee:04 | dd:40 | 40.0.0.40 | 10.0.0.10 | Payload |

As shown:
Destination MAC address field: ee:04—which is the MAC address of the ingress interface Int4 of R34 140.
Source MAC address field: dd:40—which is the MAC address of Node-D 141.
Source IP address field: 40.0.0.40—which is the IP address of Node-D 141
Destination IP address field: 10.0.0.10—which is the IP address of Node-A 121.
It is obvious that router R34 140 is the source router, because router R34 140 looks at the source IP address field of the data frame. As the source IP address entry (40.0.0.40) is in the same subnet as the IP address of the ingress interface (40.0.0.1/24) of R34 140, R34 140 looks at the destination IP address field of the data frame. Because the destination IP address field of the frame matches with any of the router's route lines (#1) in the routing table of R34 140, but not a "directly connected" one, this router is a source router.

The routing table of R34 140 is presented below

| Route Line # | Destination Subnet | Next hop | Egress interface | Ref. MAC |
|---|---|---|---|---|
| 1 | 10.0.0.0/24 | 60.0.0.2 | Int6 | ee:12 |
| 2 | 20.0.0.0/24 | 60.0.0.2 | Int6 | |
| 3 | 60.0.0.0/30 | "Directly connected" | Int6 | |
| 4 | 30.0.0.0/24 | "Directly connected" | Int3 | |
| 5 | 40.0.0.0/24 | "Directly connected" | Int4 | |

R34 140 needs to send out the frame though the egress interface (Int6) indicated in the entry line (line #1) of the routing table that matches with the destination IP address (10.0.0.10) in the received data frame. The router R34 140 replaces the source MAC address field of the data frame with the MAC address of its egress interface (ee:34). Router R34 140 looks at its routing table and retrieves, based on the IP address of the destination node Node-A 121 (10.0.0.0.10), the MAC address of the interface of destination router R12 120 indicated in the Ref. MAC entry (ee:12). As shown in the routing table of R34 140, there is a Ref.MAC entry (ee:12) in line #1 of the routing table. Router R34 140 replaces the destination MAC address field of the data frame with this MAC address of the interface of router R12 120.

The data frame from R34 140 through egress interface Int6 is shown below:

| Layer 2 address | | Layer 3 address | | |
|---|---|---|---|---|
| Destination MAC address | Source MAC address | Source IP address | Destination IP address | |
| ee:12 | ee:34 | 40.0.0.40 | 10.0.0.10 | Payload |

It should be noted that R34 140 does not need to find out the MAC address of the next hop router (R0 130). This is because there is a Ref. MAC entry (ee:12) in the routing table of R34 140 that corresponds to the MAC address of the interface of destination router R12 120. R34 140 then sends the data frame to router R0 130 through interface Int6.

The routing table of R0 130 presented before is shown below

| Route Line | Destination Subnet | Next hop | Egress interface | Ref. MAC |
|---|---|---|---|---|
| 1 | 30.0.0.0/24 | 60.0.0.1 | Int6 | |
| 2 | 40.0.0.0/24 | 60.0.0.1 | Int6 | |
| 3 | 10.0.0.0/24 | 50.0.0.1 | Int5 | ee:12 |
| 4 | 20.0.0.0/24 | 50.0.0.1 | Int5 | |
| 5 | 50.0.0.0/30 | "Directly connected" | Int5 | |
| 6 | 60.0.0.0/30 | "Directly connected" | Int6 | |

Transit router R0 130 receives the data frame from R34 140. Router R0 130 looks at its routing table to see if there is any Ref. MAC entry that is the same as the destination MAC address field indicated in the data frame. Since there is a Ref. MAC entry (ee:12) that is the same as the destination MAC address field of the data frame, R0 130 looks at its routing table to see if there is any Ref. MAC entry that is the same as the source MAC address field of the data frame. The source MAC address field of the data frame is ee:34. Because there is no Ref. MAC entry that is ee:34 in the routing table, R0 130 looks at the source IP address field of the data frame (40.0.0.40) and R0 130 sets/indicates the MAC address of the egress interface of R34 140 indicated in the source MAC address field of the frame in an entry line of the routing table of R0 130 that matches with the source IP address field of the received data frame. In other words, in line 2 of the routing table of R0 130, the router sets/indicate ee:34 (MAC address of egress interface of R34 140) in the Ref. MAC entry (which matches with source IP address field (40.0.0.40) of the data frame).

The updated routing table of transit router R0 130 is shown below:

| Route Line | Destination Subnet | Next hop | Egress interface | Ref. MAC |
|---|---|---|---|---|
| 1 | 30.0.0.0/24 | 60.0.0.1 | Int6 | |
| 2 | 40.0.0.0/24 | 60.0.0.1 | Int6 | ee:34 |
| 3 | 10.0.0.0/24 | 50.0.0.1 | Int5 | ee:12 |
| 4 | 20.0.0.0/24 | 50.0.0.1 | Int5 | |
| 5 | 50.0.0.0/30 | "Directly connected" | Int5 | |
| 6 | 60.0.0.0/30 | "Directly connected" | Int6 | |

R0 130 then sends the data frame to router R12 120 through the egress interface indicated in the entry line of the routing table of R0 130 that matches with the destination MAC address field of the frame. The egress interface is Int5 of R0 130 (see line #3 of the routing table of R0 130).

The data frame sent from R0 130 to R12 120 is shown below:

| Layer 2 address | | Layer 3 address | | |
|---|---|---|---|---|
| Destination MAC address | Source MAC address | Source IP address | Destination IP address | |
| ee:12 | ee:34 | 40.0.0.40 | 10.0.0.10 | Payload |

It is important to note that router R0 130 does not make any change to the source or destination MAC address fields of the data frame prior to sending it to Router R12 120. If it was the prior art solution, both the destination and source MAC address fields of the frame need to updated with the MAC address of the next hop and the egress interface respectively.

Router R12 120 receives the data frame. Since the source IP address field of the data frame (40.0.0.40) is not in the same subnet as that of the IP address of the ingress interface (50.0.0.1/30), router R12 120 looks at the destination IP address field of the data frame (10.0.0.10). Line #4 of the routing table of R12 120 ("directly connected") matches with the destination IP address field of the frame (10.0.0.0.10). This router R12 120 is thus the destination router.

The routing table of R12 120 is reproduced below.

| Route Line | Destination Subnet | Next hop | Egress interface | Ref. MAC |
|---|---|---|---|---|
| 1 | 30.0.0.0/24 | 50.0.0.2 | Int5 | |
| 2 | 40.0.0.0/24 | 50.0.0.2 | Int5 | |
| 3 | 50.0.0.0/30 | "Directly connected" | Int5 | |
| 4 | 10.0.0.0/24 | "Directly connected" | Int1 | |
| 5 | 20.0.0.0/24 | "Directly connected" | Int2 | |

Router R12 120 needs to forward the data frame through the egress interface (Int1) mapped to entry line #4 of the routing table of R12 120 that matches with the destination IP address entry of the data frame (10.0.0.10). Before forwarding, router R12 120 makes some modification on the Layer 2 address part of the data frame and also updates the Ref. MAC entry in its routing table as explained below.

R12 120 looks at the Ref. MAC entry which is mapped to the entry line (#2) that matches with the source IP address field of the data frame (40.0.0.40). Since there is no Ref. MAC entry there, R12 120 sets/indicates the source MAC address field of the data frame (ee:34) in the entry line of the routing table of R12 120 that matches with the source IP address field of the data frame. In other words, R12 120 sets/indicates ee:34 in Ref. MAC entry in line #2.

The updated routing table of R12 120 is shown below:

| Route Line | Destination Subnet | Next hop | Egress interface | Ref. MAC |
|---|---|---|---|---|
| 1 | 30.0.0.0/24 | 50.0.0.2 | Int5 | |
| 2 | 40.0.0.0/24 | 50.0.0.2 | Int5 | ee:34 |
| 3 | 50.0.0.0/30 | "Directly connected" | Int5 | |
| 4 | 10.0.0.0/24 | "Directly connected" | Int1 | |
| 5 | 20.0.0.0/24 | "Directly connected" | Int2 | |

R12 120 replaces the destination MAC address field of the data frame with the MAC address of Node-A 121 (aa:10) and the source MAC address field of the data frame with the MAC address of the egress interface of R12 120 (ee:01). The egress interface of R12 120 is indicated in entry line #4 of the routing table of R12 120, that matches with the destination IP address field of the data frame 10.0.0.10. This egress interface is Int1 as mentioned above.

The data frame from R12 120 to Node-A 121 through egress interface Int1 is shown below:

| Layer 2 address | | Layer 3 address | | |
|---|---|---|---|---|
| Destination MAC address | Source MAC address | Source IP address | Destination IP address | |
| aa:10 | ee:01 | 40.0.0.40 | 10.0.0.10 | Payload |

Node-A 121 receives the data frame and since it see its own MAC address as the destination MAC address field of the data frame, it accept the data frame.

As we can see from the routing tables of routers R12 120, R0 130 and R34 140, the Ref. MAC entry for subnet (or network) 10.0.0.0/24 (ee:12) and Ref. MAC entry for subnet (or network) 40.0.0.0/24 (ee:34) are the same in all the routing tables.

FIG. 2B, illustrates the structure of the data frame from Node-D 141 through the routers R34 140, R0 130, R12 120, destined to Node-A 121, in accordance with the procedure presented above. As shown, the transit router R0 130 does not change the source MAC address field and the destination MAC address field of the data frame.

The following procedure, according to some embodiments herein, describes the scenario when Node-A 121 want again to send yet a data frame to Node-D 141.
We call this SCENARIO 3

In this scenario, the first router R12 120 acts as source router; the second router R0 130 acts as transit router and the third router R34 140 acts as destination router. Node-A 121 is the source node, and Node-D 141 is the destination node.

Similar to Scenario 1, the data frame from Node-A 121 to R12 120 includes the following information:

| Layer 2 address | | Layer 3 address | |
|---|---|---|---|
| Destination MAC address | Source MAC address | Source IP address | Destination IP address |
| ee:01 | aa:10 | 10.0.0.10 | 40.0.0.40 | Payload |

Destination MAC address field: ee:01—which is the MAC address of the ingress interface Int1 of R12 120.

Source MAC address field: aa:10—which is the MAC address of Node-A 121.

Source IP address field: 10.0.0.10—which is the IP address of Node-A 121

Destination IP address field: 40.0.0.40—which is the IP address of Node-D 141.

The routing table of R12 120 is reproduced below:

| Route Line | Destination Subnet | Next hop | Egress interface | Ref. MAC |
|---|---|---|---|---|
| 1 | 30.0.0.0/24 | 50.0.0.2 | Int5 | |
| 2 | 40.0.0.0/24 | 50.0.0.2 | Int5 | ee:34 |
| 3 | 50.0.0.0/30 | "Directly connected" | Int5 | |
| 4 | 10.0.0.0/24 | "Directly connected" | Int1 | |
| 5 | 20.0.0.0/24 | "Directly connected" | Int2 | |

Similar to SCENARIO 1, R12 120 checks the destination MAC address field of the data frame and sees the MAC address ee:01 of its ingress interfaces Int1. Router R12 120 looks at the source IP address field of the data frame. As the source IP address is 10.0.0.10 which is in the same subnet as the IP address of the ingress interface 10.0.0.1/24, then the router looks at the destination IP address field of the data frame. Since the destination IP address field includes destination IP address 40.0.0.40 which matches with one of the entry lines (line 2) of the routing table of R12 120 and it is not a "directly connected" one, then R12 120 is the source router. In this case R12 120 needs to know the egress interface of R12 120 indicated in entry line 2 of the routing table of R12 120 that matches with the destination IP address field of the received data frame. This interface is indicated as Int5 in entry line 2 of the routing table of R12 120.

Before sending the data frame through Int5, R12 120 needs to perform two modifications to the Layer 2 of the received the data frame:

R12 120 replaces the source MAC address field in the data frame with a MAC address of the egress interface of R12 120, i.e., replaces aa:10 with ee:12; and R12 120 looks at the Ref. MAC entry of the route line (#2) that matches with the IP address Node-D 141 (40.0.0.40).

So contrary to SCENARIO 1, there is now a Ref. MAC entry in line #2 of the routing table. This entry is ee:34 and it is the MAC address of the ingress interface of router R34 140. Router R12 120 retrieves this entry (ee:34) from the routing table and replaces the destination MAC address field of the data frame with this MAC address (ee:34) of the ingress interface of router R34 140.

Router R12 120 then sends the following data frame to the second router (transit router) R0 130 through egress interface Int5:

| Layer 2 address | | Layer 3 address | |
|---|---|---|---|
| Destination MAC address | Source MAC address | Source IP address | Destination IP address |
| ee:34 | ee:12 | 10.0.0.10 | 40.0.0.40 | Payload |

It should be noted, that contrary to SCENARIO 1, the destination MAC address field (ee:34) of the data frame is not the MAC address of the ingress interface of R0 130, which is ee:52. Instead in SCENARIO 3, the destination MAC address field of the data frame is the MAC address of the ingress interface of the destination router R34 140, which is indicated in the routing table of R12 120 (at line 2).

Transit router R0 130 receives the data frame. R0 130 looks at its routing table to see if there is any Ref. MAC entry equal to the destination MAC address field of the data frame.

The routing table of R0 130 is reproduced below:

| Route Line | Destination Subnet | Next hop | Egress interface | Ref. MAC |
|---|---|---|---|---|
| 1 | 30.0.0.0/24 | 60.0.0.1 | Int6 | |
| 2 | 40.0.0.0/24 | 60.0.0.1 | Int6 | ee:34 |
| 3 | 10.0.0.0/24 | 50.0.0.1 | Int5 | ee:12 |
| 4 | 20.0.0.0/24 | 50.0.0.1 | Int5 | |
| 5 | 50.0.0.0/30 | "Directly connected" | Int5 | |
| 6 | 60.0.0.0/30 | "Directly connected" | Int6 | |

As there is an Ref. MAC entry equal to the destination MAC address field of the frame (ee:34), then router R0 130 looks at its routing table to see if there is any Ref. MAC entry equal to the source MAC address field of the frame. There is also a Ref. MAC entry equal to the source MAC address field of the frame (ee:12), and because there is an egress interface mapped to that Ref. MAC entry as well, in this case router R0 130 knows how to reach to a router with that destination MAC address/Ref. MAC entry.

So, router R0 130 does not need to make any change to the data frame or to its routing table. Instead, router R0 130 sends out the data frame through the egress interface (Int 6) (see line #2) which is mapped to the route line that has the same Ref. MAC entry (ee:34) as the destination MAC address field of the data frame. Router R0 130 forwards the data frame to destination router R34 140 through the egress interface Int6 indicated in line #2 of the routing table of R0 130 that matches with the destination MAC address field (ee:34) of the data frame.

Router R0 130 does not need to do any changes to the data frame or to its routing table, and also does not need to look at Layer 3 of the data frame. So, the data frame from R0 130 to R34 140 is again:

| Layer 2 address | | Layer 3 address | | |
|---|---|---|---|---|
| Destination MAC address | Source MAC address | Source IP address | Destination IP address | |
| ee:34 | ee:12 | 10.0.0.10 | 40.0.0.40 | Payload |

When router R34 140 (destination router) receives the data frame. R34 140 looks at the destination MAC address field of the data frame and sees the MAC address (ee:34) of its ingress interface (Int6).

The routing table of R34 140 is reproduced below

| Route Line # | Destination Subnet | Next hop | Egress interface | Ref. MAC |
|---|---|---|---|---|
| 1 | 10.0.0.0/24 | 60.0.0.2 | Int6 | ee:12 |
| 2 | 20.0.0.0/24 | 60.0.0.2 | Int6 | |
| 3 | 60.0.0.0/30 | "Directly connected" | Int6 | |
| 4 | 30.0.0.0/24 | "Directly connected" | Int3 | |
| 5 | 40.0.0.0/24 | "Directly connected" | Int4 | |

As the source IP address entry field of the data frame (10.0.0.10) is not in the same subnet with the IP address of the ingress interface (60.0.0.1/30), router R34 140 looks at the destination IP address field of the frame (40.0.0.40).

Because one of the route lines (#5) of router R34 140 ("Directly Connected" one) matches with the destination IP address of the data frame, then this router is the destination router.

In this case R34 140 needs to forward the frame through the egress interface (int4) mapped to route line (#5) that matches with the destination IP address entry of the frame (40.0.0.40).

Before forwarding, R34 140 needs to do some modification on the L2 address part of the frame and also may need to do some modification for the Ref. MAC entry of its routing table:

Router R34 140 looks at the Ref. MAC entry which is mapped to the route line (#1) which is matched with the source IP address field of the frame (10.0.0.10).

Because there is an Ref. MAC entry in line #1, R34 140 does not need to do any update to its routing table. It just follows the standard procedure to forward the frame to the destination node Node-D 141 by replacing the destination MAC address field of the data frame with the MAC address of the Node-D 141 (dd:40), and by replacing the source MAC address field of the data frame with the MAC address of the egress interface or router R34 140 (ee:04). The data frame from R34 140 to Node-D 141 is shown below.

| Layer 2 address | | Layer 3 address | | |
|---|---|---|---|---|
| Destination MAC address | Source MAC address | Source IP address | Destination IP address | |
| dd:40 | ee:04 | 10.0.0.10 | 40.0.0.40 | Payload |

Node-D 141 receives the data frame and as it sees its own MAC address as the destination MAC address field of the frame, it accepts the frame.

FIG. 2C, illustrates the structure of the data frame from Node-A through the routers R12, R0 R 34, destined to Node-D, in accordance with the procedure presented above. As shown, the transit router R0 130 does not change the source MAC address field of the data frame, as was the case in SCENARIO 1.

It should be mentioned that the embodiments are not restricted to only three routers and to only two nodes. Any number of routers, nodes, etc. may be employed.

As was demonstrated, Ref. MAC entries are updated in the routing tables by transferring the firstly data frame (SCENARIO 1) and secondly data frame (SCENARIO 2). But there is no need to update the routing tables for the thirdly frame (SCENARIO 3).

It should be mentioned that the routing procedure according to the embodiments herein do not require any change in the standard routing protocols.

It is clear from the procedure presented earlier that an advantageous of the present invention includes improving the performance of each router and also increasing the traffic forwarding speed of each router, in addition to reducing resources of the routers in the network topology.

Figure 3:
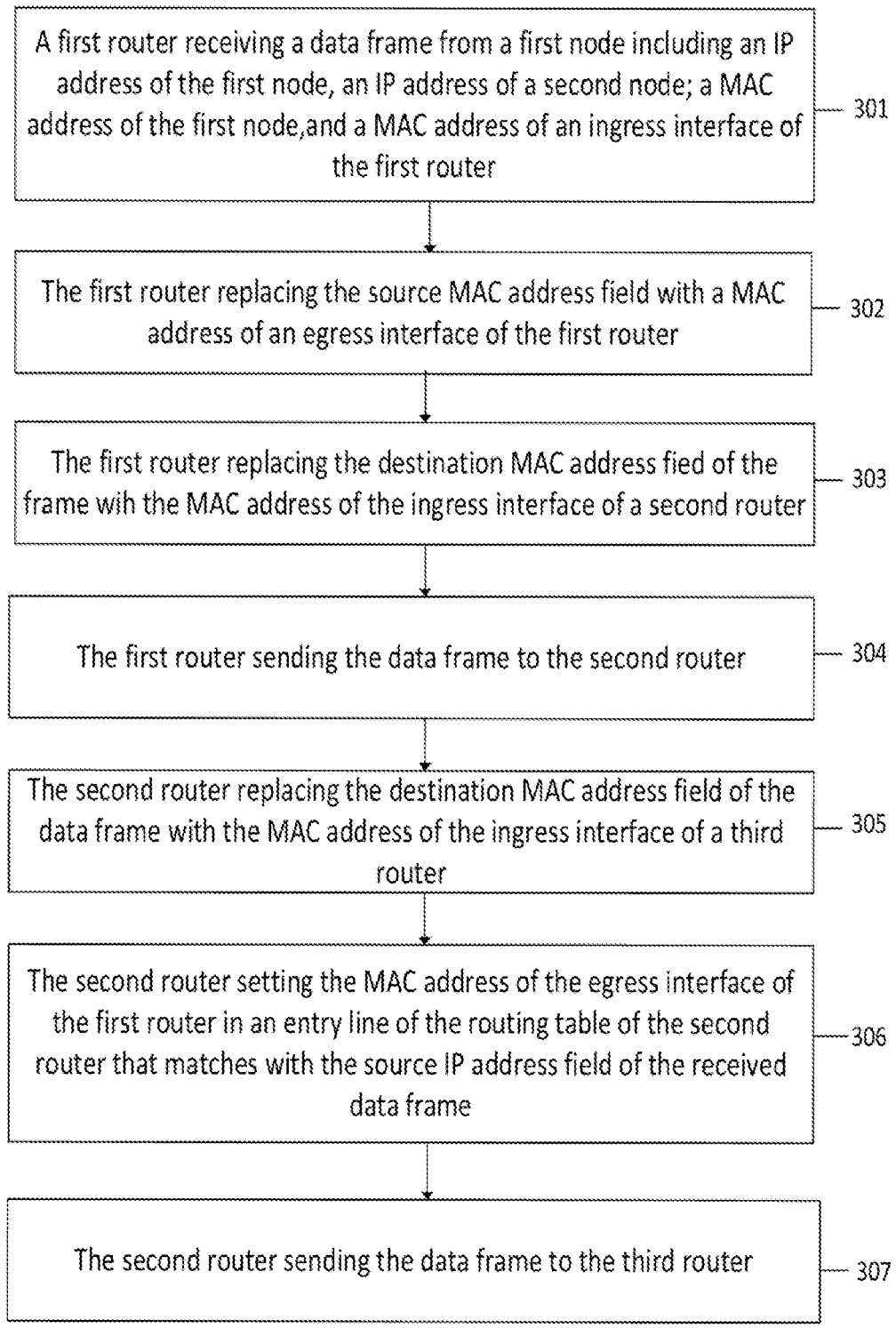
FIG. 3 illustrates a flowchart of a method according to some embodiments herein.

To summarize some of the embodiments previously described, FIG. 3 illustrates a method, according to previously described embodiments, for routing data frames in a system or in a network topology comprising a plurality of routers R12 121, R0 130, R34 140 and a plurality of nodes Node-A 121, Node-D 141. The method comprising:

(301) a first router R12 120 receiving from a first node Node-A 121 a data frame including: an IP address of the first node Node-A 121 in a source IP address field of the data frame, an IP address of a second node Node-D 141 in a destination IP address field of the data frame, a MAC address of the first node Node-A 121 in a source MAC address field of the data frame, and in a destination MAC address field of the data frame a MAC address of an ingress interface of the first router R12 120 obtained by the first node Node-A 121 from the first router R12 120;

(302) if the first router R12 120 is a source router, the source router R12 120 replacing the source MAC address field in the data frame with a MAC address of an egress interface of the first router R12 120, wherein the egress interface of the first router is indicated in an entry line of routing table of the first router R12 20 that matches with the destination IP address field in the received data frame;

(303) the first router R12 120 determining, based on the IP address of the second node Node-D 141, a MAC address of an ingress interface of a second router R0 130, and replacing the destination MAC address field of the data frame with the MAC address of the ingress interface of the second router R0 130;

(304) the first router R12 120 sending the data frame to the second router R0 130 through the egress interface of the first router R12 120;

(305) if the second router R0 130 is a transit router, the transit router R0 130 determining, based on the IP address of the second node Node-D 141 indicated in the destination IP address field in the received data frame, a MAC address of an ingress interface of a third router R34 140, and the second router R0 130 replacing the destination MAC address field in the received data frame with the MAC address of the ingress interface of the third router R34 140;

(306) the second router R0 130 as the transit router setting/indicating the MAC address of the egress interface of the first router R12 120 indicated in the source MAC address field of the data frame, in an entry line of a routing table of the transit router R0 130 that matches with the source IP address field of the received data frame; and (307) the second router R0 130 sending the data frame to the third router R34 140 through an egress interface of the second router R0 130 that matches with the destination IP address field of the received data frame;

According to an embodiment, and as previously described, if the third router R34 140 is the destination router (R34 140), the destination router (R34 140) replacing the destination MAC address of the received data frame with the MAC address of the second node Node-D 141; and the source MAC address of the data frame with the MAC address of an egress interface of the third router R34 140, wherein the egress interface of the third router R34 140 is indicated in an entry line of a routing table of the third router R34 140 that matches with the destination IP address field in the received data frame.

The third router R34 140 then forwarding the data frame to the second node Node-D 141 based on the destination MAC address indicated in the data frame; and the third router R34 140 setting/indicating the MAC address of the egress interface of the first router (R12 120) indicated in the source MAC address field of the data frame, in an entry line of the routing table of the third router R34 140 that matches with the source IP address field of the received data frame.

According to an embodiment, the method comprises the first node Node-A 121 sending an ARP (Address Resolution Protocol) request to the first router R12 120 to obtain the MAC address of the ingress interface of the first router R12 120.

According to an embodiment, the method comprises the first router R12 120 determining based on the IP address of the second node Node-D 141, a MAC address of the ingress interface of the second router R0 130, includes, either retrieving the MAC address of the ingress interface of the second router R0 130 from an ARP table of the first router R12 120, or if not present in the ARP table of the first router R12 120, the first node Node-A 121 sending an ARP request to the second router R0 130 to obtain the MAC address of the ingress interface of the second router R0 130.

According to an embodiment, the first router R12 120 is the source router if the source IP address in the received data frame is in a same subnet as an IP address of the ingress interface of the first router R12 120 and the destination IP address field of the received data frame is not in a same subnet as an IP address of anyone of the interfaces of the first router R12 120.

According to an embodiment, the second router R0 130 is a transit router R0 130 if the source IP address and the destination IP address indicated in the data frame are not in a same subnet as an IP address of anyone of the interfaces of the second router R0 130.

According to an embodiment, the method comprises the second router R0 130 determining based on the IP address of the second node Node-D 141, a MAC address of the ingress interface of said third router R34 140, includes, either retrieving the MAC address of the ingress interface of the third router R34 140 from an ARP table of the second router R0 130, or if not present in the ARP table of the second router R0 130, sending an ARP request to the third router R34 140 to obtain the MAC address of the ingress interface of the third router R34 140.

According to an embodiment, the third router R34 140 is the destination router R34 140 if the destination IP address indicated in the data frame received by the third router R34 140 is in a same subnet as an IP address of one of the interfaces of the third router R34 140.

The following method steps relates to SCENARIO 2 previously described i.e., when Node-D 141 wants to send a data frame to Node-A 121.

According to an embodiment, the method comprises the third router R34 140 receiving a data frame from the second node Node-D 141, the data frame including: the IP address of the second node Node-D 141 in a source IP address field of the data frame, the IP address of the first node Node-A 121 in a destination IP address field of the data frame, a MAC address of the second node Node-D 141 in a source MAC address field of the data frame, and a MAC address of the ingress interface of the third router R34 140 in a destination MAC address field of the data frame. The method further comprises, the third router R34 140 replacing the source MAC address field of the data frame with a MAC address of an egress interface of the third router R34 140, wherein the egress interface of the third router R34 140 is indicated in an entry line of the routing table of the third router R34 140 that matches with the destination IP address field in the received data frame. The third router R34 140 retrieving from the routing table of the third router R34 140, based on the IP address of the first node Node-A 121, the MAC address of the interface of the first router R12 120, and replacing the destination MAC address field of the data frame with the MAC address of the interface of the first router R12 120; and the third router R34 140 sending the data frame to the second router R0 130 being a transit router through the egress interface of the third router R34 140.

According to an embodiment, the method further comprises, the second router R0 130 receiving the data frame from the third router R34 140; the second router R0 130 setting/indicating the MAC address of the egress interface of the third router R34 140 indicated in the source MAC address field of the data frame, in an entry line of the routing table of the second router R0 130 that matches with the source IP address field of the received data frame; and the second router R0 130 sending the data frame to the first router R12 120 through the egress interface indicated in an entry line of the routing table of the second router R0 130 that matches with the destination MAC address field of the received data frame.

The method further comprises, the first router R12 120 receiving the data frame from the second router R0 130; the first router R12 120 setting/indicating the MAC address of the egress interface of the third router R34 140 indicated in the source MAC address field in the received data frame, in an entry line of the routing table of the first router R12 120 that matches with the source IP address field of the received data frame; and the first router R12 120 replacing the destination MAC address field of the data frame with the MAC address of the first node Node-A 121; and replacing the source MAC address of the data frame with the MAC address of the egress interface of the first router R12 120 that matches with the destination IP address field of the received data frame, and the first router R12 120 forwarding the data frame to the first node Node-A 121 based on the destination MAC address indicated in the data frame.

The following method steps relates to SCENARIO 3 previously described i.e., when Node-A 121 wants to send yet a data frame to Node-D 141.

According to an embodiment, the method comprises, the first router R12 120 receiving a data frame from the first node Node-A 121, the data frame including: the IP address of the first node Node-A 121 in a source IP address field of the data frame, the IP address of the second node Node-D 141 in a destination IP address field of the data frame, a MAC address of the first node Node-A 121 in a source MAC address field of the data frame, and a MAC address of the ingress interface of the first router R12 120 in a destination MAC address field of the data frame. The method further comprises, the first router R12 120 replacing the source MAC address field of the received data frame with a MAC address of the egress interface of the first router R12 120, wherein the egress interface of the first router is indicated in an entry line of the routing table of the first router R12 120 that matches with the destination IP address field in the received data frame. The first router R12 120 retrieving from the routing table of the first router R12 120, based on the IP address of the second node Node-D 141, the MAC address of the ingress interface of the third router R34 140, and replacing the destination MAC address field of the data frame with the MAC address of the ingress interface of the third router R34 140. The first router R12 120 sending the data frame to the second router R0 130 being a transit router through the egress interface of the first router R12 120. The second router R0 130 receiving the data frame from the first router R12 120; and the second router R0 130 forwarding the data frame to the third router R34 140 through the egress interface indicated in an entry line of the routing table of the second router R0 130 that matches with the destination MAC address field in the received data frame.

According to an embodiment, the method further comprises, the third router R34 140 receiving the data frame from the second router R0 130. The third router R34 140 replacing the destination MAC address field of the data frame with the MAC address of the second node Node-D 141; and replacing the source MAC address of the data frame with the MAC address of the egress interface of the third router R34 140, wherein the egress interface of the third router R34 140 is indicated in an entry line of the routing table of the third router R34 140 that matches with the destination IP address field in the received data frame; and the third router R34 140 forwarding the data frame to the second node Node-D 141 based on the destination MAC address indicated in the data frame.

As previously described, there is also provided a system for routing data frames in a network topology comprising a plurality of routers and a plurality of nodes. The embodiments related to the system have already been described and are described in the system claims 14-25. All the details performed by the routers and nodes have already been described and need not be repeated again.

Figure 4:
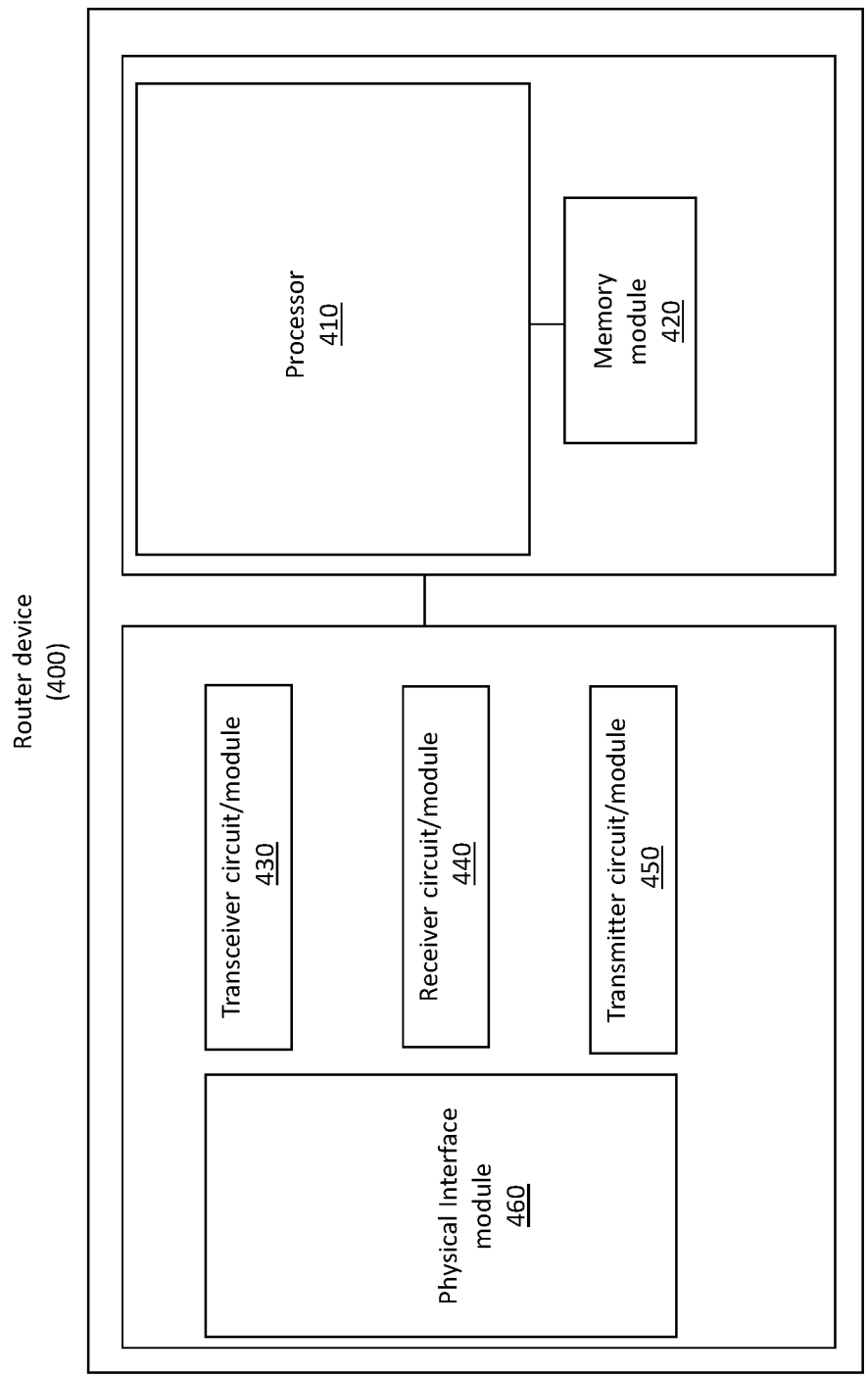
FIG. 4 illustrates a block diagram of a router device according to some embodiments herein.

There is also provided a router device 400 as shown in FIG. 4. The router device 400 may be anyone of routers R12, R0, R34 previously presented. The router 400 comprises a processing circuitry or a processing module or a processor 410; a memory module 420; a receiver circuit or receiver module 440; a transmitter circuit or a transmitter module 450 and a transceiver circuit or a transceiver module 430 which may include transmitter circuit 450 and receiver circuit 440. The router device 400 is also shown including an interface port system 460 which may include a plurality of interfaces as previously described. The processor 410 is configured to execute program instructions from a computer program stored in a non-transitory computer-readable medium that is, or is accessible to the processing circuitry. Here, "non-transitory" does not necessarily mean permanent or unchanging storage, and may include storage in working or volatile memory, but the term does connote storage of at least some persistence. The execution of the program instructions stored in the memory module 420 specially adapts or configures the processor 410 to carry out the operations of the router network node 400 disclosed herein. Further, it will be appreciated that the router device 400 may comprise additional components not shown in FIG. 4. The method performed by the router 400 have already been described There is also provided a computer program comprising instructions which when executed on at least one processor of the router 400, cause the at least one processor 410 (of the router 400) to carry out the method or procedure related to the router as previously described.

The embodiments herein are not restricted to any number of sites, subnets, host nodes etc. Throughout this disclosure, the word "comprise" or "comprising" has been used in a non-limiting sense, i.e., meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for routing data frames in a network topology comprising a plurality of routers and a plurality of nodes; the method comprising:

a first router (R12 120) receiving from a first node (Node-A 121) a data frame including an Internet Protocol (IP) address of the first node (Node-A 121) in a source IP address field of the data frame, an IP address of a second node (Node-D 141) in a destination IP address field of the data frame, a Medium Access Control (MAC) address of the first node (Node-A 121) in a source MAC address field of the data frame, and in a destination MAC address field of the data frame a MAC address of an ingress interface of the first router (R12 120) obtained by the first node (Node-A 121) from the first router (R12 120);

if the first router (R12 120) is a source router (R12 120), the source router (R12 120) replacing the source MAC address field in the data frame with a MAC address of an egress interface of the first router (R12 120), wherein the egress interface of the first router is indicated in an entry line of a routing table of the first router (R12 120) that matches with the destination IP address field in the received data frame;

the first router (R12 120) determining, based on the IP address of the second node (Node-D 141), a MAC address of an ingress interface of a second router (R0 130), and replacing the destination MAC address field of the data frame with the MAC address of the ingress interface of the second router (R0 130);

the first router (R12 120) sending the data frame to the second router (R0 130) through the egress interface of the first router (R12 120);

if the second router (R0 130) is a transit router (R0 130), the transit router (R0 130) determining, based on the IP address of the second node (Node-D 141) indicated in the destination IP address field in the received data frame, a MAC address of an ingress interface of a third router (R34 140), and the second router (R0 130) replacing the destination MAC address field in the received data frame with the MAC address of the ingress interface of the third router (R34 140);

the second router (R0 130) as the transit router (R0 130) setting/indicating the MAC address of the egress interface of the first router (R12 120) indicated in the source MAC address field of the data frame, in an entry line of a routing table of the transit router (R0 130) that matches with the source IP address field of the received data frame;

the second router (R0 130) sending the data frame to the third router (R34 140) through an egress interface of the second router (R0 130) that matches with the destination IP address field of the received data frame;

if the third router (R34 140) is the destination router (R34 140), the destination router (R34 140) replacing the destination MAC address of the received data frame with the MAC address of the second node (Node-D 141), and the source MAC address of the data frame with the MAC address of an egress interface of the third router (R34 140), wherein the egress interface of the third router (R34 140) is indicated in an entry line of a routing table of the third router (R34 140) that matches with the destination IP address field in the received data frame; the third router (R34 140) forwarding the data frame to the second node (Node-D 141) based on the destination MAC address indicated in the data frame; and the third router (R34 140) setting/indicating the MAC address of the egress interface of the first router (R12 120) indicated in the source MAC address field of the data frame, in an entry line of the routing table of the third router (R34 140) that matches with the source IP address field of the received data frame;

the third router (R34 140) receiving a data frame from the second node (Node-D 141), the data frame including the IP address of the second node (Node-D 141) in a source IP address field of the data frame, the IP address of the first node (Node-A 121) in a destination IP address field of the data frame, a MAC address of the second node (Node-D 141) in a source MAC address field of the data frame, and a MAC address of the ingress interface of the third router (R34 140) in a destination MAC address field of the data frame;

the third router (R34 140) replacing the source MAC address field of the data frame with a MAC address of an egress interface of the third router (R34 140), wherein the egress interface of the third router (R34 140) is indicated in an entry line of the routing table of the third router (R34 140) that matches with the destination IP address field in the received data frame;

the third router (R34 140) retrieving from the routing table of the third router (R34 140), based on the IP address of the first node (Node-A 121), the MAC address of the interface of the first router (R12 120), and replacing the destination MAC address field of the data frame with the MAC address of the interface of the first router (R12 120); and the third router (R34 140) sending the data frame to the second router (R0 130) being a transit router through the egress interface of the third router (R34 140).

2. The method according to claim 1, further comprising, the first node (Node-A 121) sending an Address resolution Protocol (ARP) request to the first router (R12 120) to obtain the MAC address of the ingress interface of the first router (R12 120).

3. The method according to claim 1, further comprising the first router (R12 120) determining based on the IP address of the second node (Node-D 141), a MAC address of the ingress interface of the second router (R0 130), including, either retrieving the MAC address of the ingress interface of the second router (R0 130) from an ARP table of the first router (R12 120), or if not present in the ARP table of the first router (R12 120), sending an ARP request to the second router (R0 130) to obtain the MAC address of the ingress interface of the second router (R0 130).

4. The method according to claim 1, wherein the first router (R12 120) is the source router if the source IP address in the received data frame is in a same subnet as an IP address of the ingress interface of the first router (R12 120) and the destination IP address field of the received data frame is not in a same subnet as an IP address of any one of the interfaces of the first router (R12 120).

5. The method according to claim 1, wherein the second router (R0 130) is a transit router (R0 130) if the source IP address and the destination IP address indicated in the data frame are not in a same subnet as an IP address of anyone of the interfaces of the second router (R0 130).

6. The method according to 1, further comprising the second router (R0 130) determining based on the IP address of the second node (Node-D 141), a MAC address of the ingress interface of said third router (R34 140), including, either retrieving the MAC address of the ingress interface of the third router (R34 140) from an ARP table of the second router (R0 130), or if not present in the ARP table of the second router (R0 130), sending an ARP request to the third router (R34 140) to obtain the MAC address of the ingress interface of the third router (R34 140).

7. The method according to claim 1, wherein the third router (R34 140) is the destination router (R34 140) if the destination IP address indicated in the data frame received by the third router (R34 140) is in a same subnet as an IP address of one of the interfaces of the third router (R34 140).

8. The method according to claim 1, further comprising:
the second router (R0 130) receiving the data frame from the third router (R34 140);
the second router (R0 130) setting/indicating the MAC address of the egress interface of the third router (R34 140) indicated in the source MAC address field of the data frame, in an entry line of the routing table of the second router (R0 130) that matches with the source IP address field of the received data frame; and
the second router (R0 130) sending the data frame to the first router (R12 120) through the egress interface indicated in an entry line of the routing table of the second router (R0 130) that matches with the destination MAC address field of the received data frame.

9. The method according to claim 8, further comprising:
the first router (R12 120) receiving the data frame from the second router (R0 130);
the first router (R12 120) setting/indicating the MAC address of the egress interface of the third router (R34 140) indicated in the source MAC address field in the received data frame, in an entry line of the routing table of the first router (R12 140) that matches with the source IP address field of the received data frame;
the first router (R12 120) replacing the destination MAC address field of the data frame with the MAC address of the first node (Node-A 121), and replacing the source MAC address of the data frame with the MAC address of the egress interface of the first router (R12 120) that matches with the destination IP address field of the received data frame, and
the first router (R12 120) forwarding the data frame to the first node (Node-A 121) based on the destination MAC address indicated in the data frame.

10. The method according to claim 9, further comprising:
the first router (R12 120) receiving a data frame from the first node (Node-A 121), the data frame including the IP address of the first node (Node-A 121) in a source IP address field of the data frame, the IP address of the second node (Node-D 141) in a destination IP address field of the data frame, a MAC address of the first node (Node-A 121) in a source MAC address field of the data frame, and a MAC address of the ingress interface of the first router (R12 120) in a destination MAC address field of the data frame;
the first router (R12 120) replacing the source MAC address field of the received data frame with a MAC address of the egress interface of the first router (R12 120), wherein the egress interface of the first router is indicated in an entry line of the routing table of the first router (R12 120) that matches with the destination IP address field in the received data frame;
the first router (R12 120) retrieving from the routing table of the first router (R12 120), based on the IP address of the second node (Node-D 141), the MAC address of the ingress interface of the third router (R34 140), and replacing the destination MAC address field of the data frame with the MAC address of the ingress interface of the third router (R34 140); and
the first router (R12 120) sending the data frame to the second router (R0 130) being a transit router through the egress interface of the first router (R12 120);
the second router (R0 130) receiving the data frame from the first router (R12 120); and
the second router (R0 130) forwarding the data frame to the third router (R34 140) through the egress interface indicated in an entry line of the routing table of the second router (R0 130) that matches with the destination MAC address field in the received data frame.

11. The method according to claim 10, further comprising:
the third router (R34 140) receiving the data frame from the second router (R0 130);
the third router (R34 140) replacing the destination MAC address field of the data frame with the MAC address of the second node (Node-D 121), and replacing the source MAC address of the data frame with the MAC address of the egress interface of the third router (R34 140), wherein the egress interface of the third router (R34 140) is indicated in an entry line of the routing table of the third router (R34 140) that matches with the destination IP address field in the received data frame; and
the third router (R34 140) forwarding the data frame to the second node (Node-D 141) based on the destination MAC address indicated in the data frame.

12. A system for routing data frames in a network topology comprising a plurality of routers and a plurality of nodes; wherein in the system:
a first router (R12 120) receives from a first node (Node-A 121) a data frame including an Internet Protocol (IP) address of the first node (Node-A 121) in a source IP address field of the data frame, an IP address of a second node (Node-D 141) in a destination IP address field of the data frame, a Medium Access Control (MAC) address of the first node (Node-A 121) in a source MAC address field of the data frame, and in a destination MAC address field of the data frame a MAC address of an ingress interface of the first router (R12 120) obtained by the first node (Node-A 121) from the first router (R12 120);
if the first router (R12 120) is a source router (R12 120), the source router (R12 120) replaces the source MAC address field in the data frame with a MAC address of an egress interface of the first router (R12 120), wherein the egress interface of the first router is indicated in an entry line of routing table of the first router (R12 20) that matches with the destination IP address field in the received data frame;
the first router (R12 120) determines, based on the IP address of the second node (Node-D 141), a MAC address of an ingress interface of a second router (R0 130), and replaces the destination MAC address field of the data frame with the MAC address of the ingress interface of the second router (R0 130);
the first router (R12 120) sends the data frame to the second router (R0 130) through the egress interface of the first router (R12 120);
if the second router (R0 130) is a transit router (R0 130), the transit router (R0 130) determines, based on the IP address of the second node (Node-D 141) indicated in the destination IP address field in the received data frame, a MAC address of an ingress interface of a third router (R34 140), and the second router (R0 130) replaces the destination MAC address field in the received data frame with the MAC address of the ingress interface of the third router (R34 140);
the second router (R0 130) as the transit router (R0 130) sets/indicates the MAC address of the egress interface of the first router (R12 120) indicated in the source MAC address field of the data frame, in an entry line of a routing table of the transit router (R0 130) that matches with the source IP address field of the received data frame; and
the second router (R0 130) sends the data frame to the third router (R34 140) through an egress interface of the second router (R0 130) that matches with the destination IP address field of the received data frame;
if the third router (R34 140) is the destination router (R34 140), the destination router (R34 140) replaces the destination MAC address of the received data frame with the MAC address of the second node (Node-D 141), and the source MAC address of the data frame with the MAC address of an egress interface of the third router (R34 140), wherein the egress interface of the third router (R34 140) is indicated in an entry line of a routing table of the third router (R34 140) that matches with the destination IP address field in the received data frame, the third router (R34 140) forwards the data frame to the second node (Node-D 141) based on the destination MAC address indicated in the data frame, and the third router (R34 140) sets/indicates the MAC address of the egress interface of the first router (R12 120) indicated in the source MAC address field of the data frame, in an entry line of the routing table of the third router (R34 140) that matches with the source IP address field of the received data frame;
the third router (R34 140) receives a data frame from the second node (Node-D 141), the data frame including the IP address of the second node (Node-D 141) in a source IP address field of the data frame, the IP address of the first node (Node-A 121) in a destination IP address field of the data frame, a MAC address of the second node (Node-D 141) in a source MAC address field of the data frame, and a MAC address of the ingress interface of the third router (R34 140) in a destination MAC address field of the data frame;

the third router (R34 140) replaces the source MAC address field of the data frame with a MAC address of an egress interface of the third router (R34 140), wherein the egress interface of the third router (R34 140) is indicated in an entry line of the routing table of the third router (R34 140) that matches with the destination IP address field in the received data frame;

the third router (R34 140) retrieves from the routing table of the third router (R34 140), based on the IP address of the first node (Node-A 121), the MAC address of the interface of the first router (R12 120), and replaces the destination MAC address field of the data frame with the MAC address of the interface of the first router (R12 120); and the third router (R34 140) sends the data frame to the second router (R0 130) being a transit router through the egress interface of the third router (R34 140).

13. The system according to claim 12, wherein the first node (Node-A 121) sends an Address resolution Protocol (ARP) request to the first router (R12 120) to obtain the MAC address of the ingress interface of the first router (R12 120).

14. The system according to claim 12, wherein the first router (R12 120) determines based on the IP address of the second node (Node-D 141), a MAC address of the ingress interface of the second router (R0 130), by either retrieving the MAC address of the ingress interface of the second router (R0 130) from an ARP table of the first router (R12 120), or if not present in the ARP table of the first router (R12 120), by sending an ARP request to the second router (R0 130) to obtain the MAC address of the ingress interface of the second router (R0 130).

15. The system according to claim 12, wherein the first router (R12 120) is the source router if the source IP address in the received data frame is in a same subnet as an IP address of the ingress interface of the first router (R12 120) and the destination IP address field of the received data frame is not in a same subnet as an IP address of anyone of the interfaces of the first router (R12 120).

16. The system according to claim 12, wherein the second router (R0 130) is a transit router (R0 130) if the source IP address and the destination IP address indicated in the data frame are not in a same subnet as an IP address of anyone of the interfaces of the second router (R0 130).

17. The system according to claim 12, wherein the second router (R0 130) determines based on the IP address of the second node (Node-D 141), a MAC address of the ingress interface of said third router (R34 140), by either retrieving the MAC address of the ingress interface of the third router (R34 140) from an ARP table of the second router (R0 130), or if not present in the ARP table of the second router (R0 130), by sending an ARP request to the third router (R34 140) to obtain the MAC address of the ingress interface of the third router (R34 140).

18. The system according to claim 12, wherein the third router (R34 140) is the destination router (R34 140) if the destination IP address indicated in the data frame received by the third router (R34 140) is in a same subnet as an IP address of one of the interfaces of the third router (R34 140).

19. The system according to claim 12, wherein:
the second router (R0 130) receives the data frame from the third router (R34 140);
the second router (R0 130) sets/indicates the MAC address of the egress interface of the third router (R34 140) indicated in the source MAC address field of the data frame, in an entry line of the routing table of the second router (R0 130) that matches with the source IP address field of the received data frame; and the second router (R0 130) sends the data frame to the first router (R12 120) through the egress interface indicated in an entry line of the routing table of the second router (R0 130) that matches with the destination MAC address field of the received data frame.

20. The system according to claim 19, wherein:
the first router (R12 120) receives the data frame from the second router (R0 130);
the first router (R12 120) sets/indicates the MAC address of the egress interface of the third router (R34 140) indicated in the source MAC address field in the received data frame, in an entry line of the routing table of the first router (R12 140) that matches with the source IP address field of the received data frame;
the first router (R12 120) replaces the destination MAC address field of the data frame with the MAC address of the first node (Node-A 121), and replaces the source MAC address of the data frame with the MAC address of the egress interface of the first router (R12 120) that matches with the destination IP address field of the received data frame, and
the first router (R12 120) forwards the data frame to the first node (Node-A 121) based on the destination MAC address indicated in the data frame.

21. The system according to claim 20, wherein:
the first router (R12 120) receives a data frame from the first node (Node-A 121), the data frame including the IP address of the first node (Node-A 121) in a source IP address field of the data frame, the IP address of the second node (Node-D 141) in a destination IP address field of the data frame, a MAC address of the first node (Node-A 121) in a source MAC address field of the data frame, and a MAC address of the ingress interface of the first router (R12 120) in a destination MAC address field of the data frame;
the first router (R12 120) replaces the source MAC address field of the received data frame with a MAC address of the egress interface of the first router (R12 120), wherein the egress interface of the first router is indicated in an entry line of the routing table of the first router (R12 120) that matches with the destination IP address field in the received data frame;
the first router (R12 120) retrieves from the routing table of the first router (R12 120), based on the IP address of the second node (Node-D 141), the MAC address of the ingress interface of the third router (R34 140), and replaces the destination MAC address field of the data frame with the MAC address of the ingress interface of the third router (R34 140);
the first router (R12 120) sends the data frame to the second router (R0 130) being a transit router through the egress interface of the first router (R12 120);
the second router (R0 130) receives the data frame from the first router (R12 120); and
the second router (R0 130) forwards the data frame to the third router (R34 140) through the egress interface indicated in an entry line of the routing table of the second router (R0 130) that matches with the destination MAC address field in the received data frame.

22. The system according to claim 21, wherein:
the third router (R34 140) receives the data frame from the second router (R0 130);
the third router (R34 140) replaces the destination MAC address field of the data frame with the MAC address of the second node (Node-D 121); and replaces the source MAC address of the data frame with the MAC address of the egress interface of the third router (R34 140), wherein the egress interface of the third router (R34 140) is indicated in an entry line of the routing table of the third router (R34 140) that matches with the destination IP address field in the received data frame; and the third router (R34 140) forwards the data frame to the second node (Node-D 141) based on the destination MAC address indicated in the data frame.

* * * * *